United States Patent [19]

Dunlap

[11] Patent Number: 4,632,631
[45] Date of Patent: Dec. 30, 1986

[54] MULTIPLE-FUNCTION HAND

[75] Inventor: Raymond R. Dunlap, Uxbridge, Mass.

[73] Assignee: Zymark Corporation, Hopkinton, Mass.

[21] Appl. No.: 613,162

[22] Filed: May 23, 1984

Related U.S. Application Data

[63] Continuation-in-part of Ser. No. 355,349, Mar. 8, 1982, Pat. No. 4,488,241, which is a continuation-in-part of Ser. No. 328,727, Dec. 8, 1981, Pat. No. 4,510,684.

[51] Int. Cl.$^4$ ............................................. B25J 15/00
[52] U.S. Cl. ..................................... 414/736; 901/41; 901/31
[58] Field of Search ...................... 414/729, 730, 736; 901/2, 86.4, 119.1, 31, 38, 41, 50; 128/654, 655; 604/154, 155

[56] References Cited

U.S. PATENT DOCUMENTS

| | | | |
|---|---|---|---|
| 3,803,704 | 4/1974 | Seidel | 901/41 X |
| 4,018,409 | 4/1977 | Burch et al. | 901/31 X |
| 4,423,406 | 12/1983 | Nakano | 901/46 X |
| 4,545,723 | 10/1985 | Clark | 901/31 X |
| 4,547,121 | 10/1985 | Nesmith | 901/31 X |

FOREIGN PATENT DOCUMENTS

| | | | |
|---|---|---|---|
| 146268 | 2/1981 | Fed. Rep. of Germany | 901/31 X |
| 59-00713 | 3/1984 | Japan | 901/31 X |
| 518452 | 7/1976 | U.S.S.R. | 414/729 |

Primary Examiner—Robert J. Spar
Assistant Examiner—D. Glenn Dayoan
Attorney, Agent, or Firm—Andrew F. Kehoe

[57] ABSTRACT

A multiple-function hand useful in automated laboratory operations, particularly liquid transfer operations. A gripper and a piston operated syringe are made compatible on a single function by mounting such that their mechanical actuating mechanisms are operated parallel to one another, while the operating vector of the syphon, i.e., the direction of piston movement and direction of gripper lift are at right angles one to the other.

6 Claims, 6 Drawing Figures

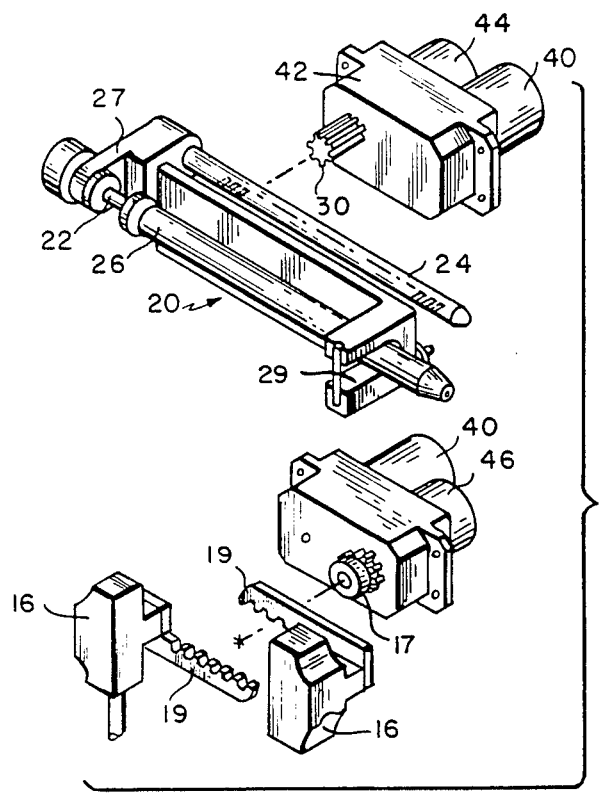
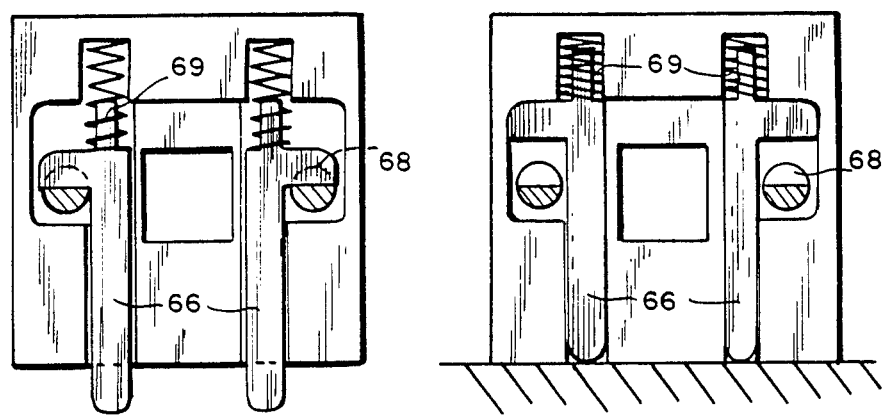
FIG. 4
FIG. 5  FIG. 6

MULTIPLE-FUNCTION HAND

RELATED APPLICATION

This application is a continuation-in-part of U.S. patent application Ser. No. 355,349 filed on Mar. 8, 1982 now U.S. Pat. No. 4,488,241 by Hutchins and Abrahams. In turn, application Ser. No. 355,349 is a continuation-in-part of U.S. patent application Ser. No. 328,727 filed on Dec. 8, 1981 now U.S. Pat. No. 4,510,684.

BACKGROUND OF THE INVENTION

This invention relates to a novel multi-function hand, or tool, which—in its contemplated operation—will be automatically detachable to a permanent "robot"-type apparatus.

Automatically changeable robot hands, sometimes called manipulators, are old in the art. Such manipulators have been devoted to single functions. These hands have been highly successful and are used in a large variety of manipulative operations that appeared to be quite independent of one another. Moreover, in many cases the principal operational vectors of different hands were at such different angles that it appeared that the use of different functions of the same hand was undesirable because of apparent geometric conflicts between such pairs of geometrical devices as, for example, grippers and syringes.

SUMMARY OF THE INVENTION

A principal object of the present invention has been to provide a compact, multi-functional, hand suitable for attachment to a permanent tool.

A particular object of the invention is to provide such a tool wherein, the tool functions must operate in different directions with respect to the opening of the container.

Another object of the invention is to provide a way to automatically transfer liquid in chemical operations with reduced risk of contamination and with improved utilization of such liquid.

Other objects of the invention will be obvious to those skilled in the art on their reading of this disclosure.

The above objects have been achieved by incorporating onto a single hand construction, two functional manipulator units. Each unit is driven, i.e., actuated by mechanical actuators which act in parallel, one with the other, even though the use of the tool requires that the overall hand construction be rotated 90° so that each functional manipulator movement can properly access, say, the containers or test tubes, being utilized in a liquid-processing operation.

Particularly surprising are the benefits achieved by the apparatus in actual use. A time-saving feature of its operation will be clearly evident from the fact that it is unnecessary to have the automatic equipment take time to "change hands". However, the value of this feature has become more apparent as use of the hand, or tool, of the invention has been used to reduce the contamination of samples from environmental sources and to avoid contamination of the environment by evaporation of sample from the container. Typically operations that once took a minute or more are reduced at 5-15 seconds. The time that containers must be open to the environment is proportionately reduced.

These factors will be seen to be of great importance when one realizes that in some circumstances valuable microbiological samples are being handled in the microliter, or even microgram, quantities.

Other aspects of the invention, not immediately apparent, relate to the fact that when one is dealing with very valuable materials and reactants, one will often wish to take a syringe back to a container repeatedly to get more of the sample. This will be done to minimize the amount of material that will eventually be discarded when the syphon is cleaned. Even when one is permitted to return some sample to the container, the present invention allows an important saving in time.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

FIG. 4 is a schematic diagram of the principal parts of a removable robotic tool constructed according to the invention. It is to be realized that these parts will normally be supported in a housing.

FIGS. 5 and 6 indicate the manner in which the tools of the invention are adapted for automatic connection to a robot arm assembly.

Figures 1, 2:
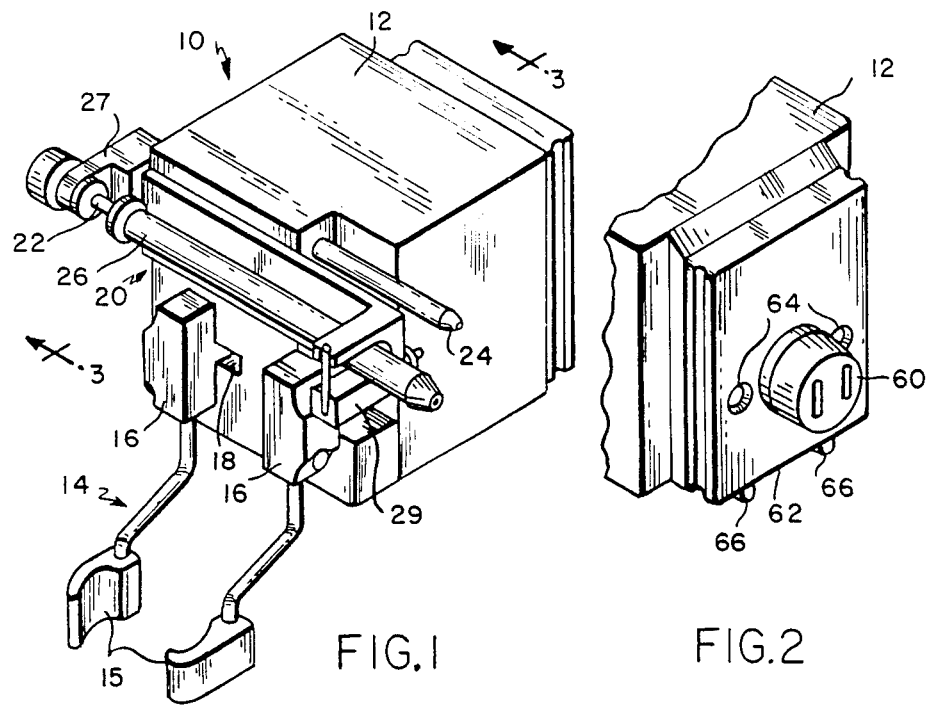
FIG. 1 is a perspective view of a robot tool, or hand, constructed according to the invention.
FIG. 2 is a perspective from the rear showing the apparatus of FIG. 1.

Referring to FIG. 1, it is seen that a robot-compatible hand 10 comprises a housing 12, typically formed of a polymer such as a polytetrafluorethyline polymers or the like, upon which is mounted a gripper tool means 14. Gripper means 14 comprises any suitable clamping members 15 which are held in brackets 16. The brackets are each adapted to ride back and forth in slots 18 in response to the action of racks 19 which are either pushed apart, or pulled together, by the rotation of pinion 17 as is necessary to grip or release a container, a container cover of the like.

Figure 3:
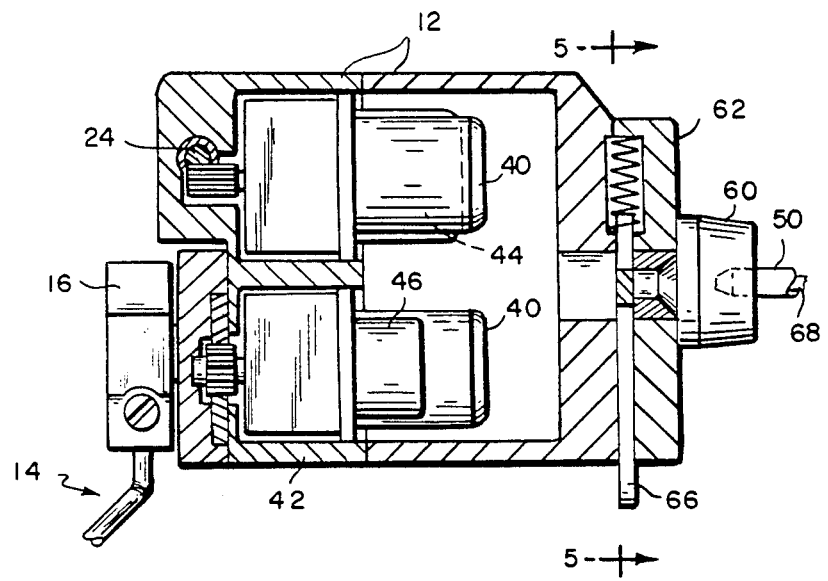
FIG. 3 is a section of the apparatus in FIG. 1 taken along the section 3:3.

Also mounted on housing 10, is a syringe 20. Syringe 20 comprises a piston 22, barrel 26 which serves as the reservoir, into which the piston pulls, or from which the piston ejects, liquid. Piston 22 is operated by an operating rod 24 through a piston-holding bracket 27 and a barrel-holding bracket 29. The operating rod is itself a rack 24 operated, as is best seen in FIG. 3, by pinion 30 which is mounted for movement parallel to that of rack and pinion which is used to operate the gripper means.

The pinions are turned by small motors 40 mounted within housing 12 on support blocks 42 which form a portion of the housing. Also mounted on the support blocks are rotary-type potentiometers 44 and 46 respectively which are capable of sensing, through the rotary position of the pinion, the position of the racks which is, at any time, the operating position of the syringe and gripper means. In practice, the potentiometer used with the syringe will be more sensitive—that is have a greater range of angular positions, say 720° or so, than the potentiometer used with the gripper. This is not only because of the inherently longer travel of the syringe piston, but also because more precision is desirable within the longer range of movement.

The necessity of turning the apparatus at right angles is achieved using a rotatable robot arm which comprise means 50 to engage hand 10. Appearing in FIGS. 5 and 6, and at the right of FIG. 6 is a prong-receiving connecting means 60 which comprises a back plate having two apertures 64 into which two prongs 50 enter. On entering they push latch means 66 upwardly until the springs can push the latch down into slots 68 and lock the device and hand in position.

Also, an electrical connecting plug means will, at the same time, connect electrical circuitry.

Except as described above, the electrical and control aspects typically associated with the robot and tool of the invention are known to the art and, since they form no part of the invention described and claimed herein, are not described in the drawings or this application. In general, however, the motors and potentiometers may be connected through control circuitry mounted within the tool on small circuit boards and these through multi-wire connectors to the robot control system.

It is also to be understood that the following claims are intended to cover all of the generic and specific features of the invention herein described and all statements of the scope of the invention which might be said to fall therebetween.

What is claimed is:

1. A multiple-function hand for rotatable attachment to a robot arm, said hand comprising at least two tools thereon, at least a first of said tools being mounted for normal use at an angle substantially normal to the angle at which a said second tool is mounted for use, and wherein each said tool is operably connected to two linear-operating means mounted in said hand, said linear-operating means being mounted parallel to one another and wherein said first tool is a gripper means and said second tool is a syringe.

2. Apparatus as defined in claim 1 wherein each said linear operating means is operated by motors and in connection with an independent rotary-potentiometer, position-sensing means and wherein said potentiometer associated with said syringe means has an angular capability of more than 720 angular degrees.

3. Apparatus as defined in claim 1 wherein each said linear-operating means is a rack and pinion means for actuating said tools.

4. Apparatus as in claim 3 wherein one said rack and pinion means is wholly contained within the housing of said hand and another rack and pinion means extends outwardly from said housing.

5. Apparatus as defined in claim 3 wherein each said rack and pinion means is operated by motors and in connection with an independent rotary-potentiometer, position-sensing means and wherein said potentiometer associated with said syringe means has an angular capability of more than 720 angular degrees.

6. A multiple-function hand for rotatable attachment to a robot arm comprising (a) a syringe tool and means to operate said syringe tool mounted on said hand and (b) gripper means and means to operate said gripper mounted on said hand with gripping surfaces adapted for movement in the same direction as is a barrel of said syringe tool.

* * * * *